United States Patent
Kawakami et al.

(10) Patent No.: US 9,111,685 B2
(45) Date of Patent: Aug. 18, 2015

(54) ELECTROLYTIC SOLUTION FOR ELECTROLYTIC CAPACITOR

(75) Inventors: Junichi Kawakami, Tokyo (JP); Masao Sakakura, Tokyo (JP); Masashi Ozawa, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 284 days.

(21) Appl. No.: 13/636,966

(22) PCT Filed: Mar. 25, 2011

(86) PCT No.: PCT/JP2011/001794
§ 371 (c)(1),
(2), (4) Date: Nov. 27, 2012

(87) PCT Pub. No.: WO2011/118234
PCT Pub. Date: Sep. 29, 2011

(65) Prior Publication Data
US 2013/0063868 A1    Mar. 14, 2013

(30) Foreign Application Priority Data

Mar. 26, 2010 (JP) ................................. 2010-071464

(51) Int. Cl.
*H01G 9/035* (2006.01)
(52) U.S. Cl.
CPC ..................... *H01G 9/035* (2013.01)
(58) Field of Classification Search
CPC ................................ H01G 9/00; H01G 9/035
USPC ........................................................ 361/506
See application file for complete search history.

(56) References Cited

U.S. PATENT DOCUMENTS

| | | | |
|---|---|---|---|
| 4,747,021 A * | 5/1988 | Morimoto et al. | 361/505 |
| 6,349,028 B1 | 2/2002 | Komatsu | |
| 6,743,370 B1 | 6/2004 | Feger et al. | |
| 2004/0062989 A1 * | 4/2004 | Ueno et al. | 429/217 |
| 2004/0252444 A1 * | 12/2004 | Kinard et al. | 361/503 |
| 2007/0115612 A1 * | 5/2007 | Minato et al. | 361/517 |
| 2008/0232037 A1 * | 9/2008 | Biler | 361/529 |

FOREIGN PATENT DOCUMENTS

| | | |
|---|---|---|
| EP | 1 061 538 | 12/2000 |
| JP | 61-294809 | 12/1986 |
| JP | 62-224919 | 10/1987 |
| JP | 63-245916 | 10/1988 |
| JP | 11-145004 | 5/1999 |
| JP | 2001-143969 | 5/2001 |
| JP | 2002-110469 | 4/2002 |
| JP | 2002-164260 | 6/2002 |
| JP | 2002-203752 | 7/2002 |
| JP | 2004-193435 | 7/2004 |
| JP | 62-63416 | 3/2007 |
| JP | 2007-273928 | 10/2007 |
| JP | 2009-88301 | 4/2009 |

OTHER PUBLICATIONS

European Patent Application No. 11759043.0 Extended European Search Report dated May 12, 2015, 8 pages.

* cited by examiner

*Primary Examiner* — Jenny L Wagner
*Assistant Examiner* — Michael P McFadden

(57) ABSTRACT

A hydrophobic film is formed on the electrode foil surface by adding a straight-chain saturated dicarboxylic acid represented by the general formula: $HOOC(CH_2)_nCOOH$ (wherein n indicates an integer from 9 to 11) to the electrolytic solution for medium/high-voltage electrolytic capacitor. Addition of a large amount of water to the electrolytic solution is allowed since this hydrophobic film suppresses the hydration reaction between the electrode foil and water. Further, it is possible to retain good lifespan property of the electrolytic capacitor in a medium/high-voltage electrolytic solution by having low specific resistance property and by suppressing the hydration decomposition of the electrode foil, wherein the electrolytic solution is azelaic acid, sebacic acid, 1-methyl-azelaic acid, 1,6-decanedicarboxylic acid, or a salt thereof dissolved in a solvent having ethylene glycol as the main component.

19 Claims, No Drawings

ELECTROLYTIC SOLUTION FOR ELECTROLYTIC CAPACITOR

TECHNICAL FIELD

The present invention relates to an electrolytic capacitor, in particular, an electrolytic solution for electrolytic capacitor used for an electrolytic capacitor having high-frequency low-impedance property and stable property at medium/high-voltage.

BACKGROUND ART

An electrolytic capacitor is configured by using a valve metal having an insulating oxide film formed on the surface of aluminum or tantalum etc. as the anodic electrode foil, using said oxide film layer as the dielectric, contacting the surface of this oxide film layer with an electrolytic solution that will be the electrolyte layer, and further placing an electrode foil ordinarily referred to as the cathode for collecting current.

The electrolytic solution for electrolytic capacitor is in direct contact with the dielectric layer as described above, and acts as a true cathode. In other words, the electrolytic solution is interpositioned between the dielectric and the collector cathode of the electrolytic capacitor, and the resistance of the electrolytic solution is serially inserted into the electrolytic capacitor. Accordingly, the property of the electrolytic solution will be a great factor in influencing the properties of an electrolytic capacitor.

In the conventional technology of electrolytic capacitors, it is common to use an electrolytic solution having high withstand voltage and small decomposition of electrode foil as the electrolytic solution for medium/high-voltage electrolytic capacitor in an attempt to stabilize properties at medium/high-voltage, wherein the electrolytic solution employs ethylene glycol as the solvent and azelaic acid, sebacic acid, 1-methyl-azelaic acid, 1,6-decanedicarboxylic acid, or a salt thereof as the solute.

In the meantime, a power factor improvement circuit has been recently integrated on the primary side of a power source as a countermeasure for high frequency, and with this, a high-frequency low-impedance electrolytic capacitor for medium/high-voltage that can withstand a large high frequency ripple current has been desired.

Conventionally, a method for reducing the impedance of an electrolytic capacitor at high frequency has been done by reducing the specific resistance of the electrolytic solution. A method of mixing a large amount of water into the electrolytic solution is known as a method for reducing the specific resistance of the electrolytic solution. (Patent Document 1)

However, when the electrolytic solution for medium/high-voltage electrolytic capacitor employed comprises a large amount of water, reliability as an electrolytic capacitor was reduced in high-temperature shelf test due to for example the oxide film of the anodic electrode foil for the medium/high-voltage electrolytic capacitor being dissolved by water in the electrolytic solution (hydration decomposition), the electric capacitance being increased compared to the initial property, and the withstand voltage being decreased.

A method for adding an additive that suppresses the hydration reaction between the electrode foil and water is known as such a method for slowing the hydration decomposition of the electrode foil. (Patent Document 2)

Patent Document 1: Japanese Published Unexamined Patent Application Publication No. 11-145004
Patent Document 2: Japanese Published Unexamined Patent Application Publication No. 2002-164260

However, in a medium/high-voltage electrolytic capacitor such as that in Patent Document 2, addition of water conventionally could not be allowed to be greater than 10 wt % in the medium/high-voltage electrolytic capacitor and thus impedance at high frequencies could not be sufficiently lowered, since the hydration reaction suppression effect of the additive against the electrode foil will become insufficient when the amount of water mixed is greater than 10 wt %. For this reason, a medium/high-voltage electrolytic capacitor that yields sufficient low-impedance property at high frequencies and has high reliability has not yet been proposed.

Accordingly, the object of the present invention is to provide a medium/high-voltage electrolytic capacitor which is high-frequency low-impedance and further having good reliability.

SUMMARY OF THE INVENTION

The present invention is the result of extensive research to solve the above problem, and as one aspect thereof, reveals that by adding a straight-chain saturated dicarboxylic acid represented by the general formula: $HOOC(CH_2)_nCOOH$ (wherein n indicates an integer from 9 to 11) to the electrolytic solution, a hydrophobic film is formed in which the oxygen of the hydroxyl group (—OH group) of the two carboxylic acids comprised in this straight-chain saturated dicarboxylic acid is thought to coordinate bond with aluminum at the electrode foil surface, and this hydrophobic film suppresses the hydration reaction between the electrode foil and water to thereby allow addition of a large amount of water to the electrolytic solution. The present invention also reveals that by adding this straight-chain saturated dicarboxylic acid, it is possible to retain good lifespan property of the electrolytic capacitor in a medium/high-voltage electrolytic solution by having low specific resistance property and by suppressing the hydration decomposition of the electrode foil, wherein the electrolytic solution is azelaic acid, sebacic acid, 1-methyl-azelaic acid, 1,6-decanedicarboxylic acid, or a salt thereof dissolved in a solvent having a large amount of water added to ethylene glycol.

In other words, the electrolytic solution for electrolytic capacitor according to one embodiment of the present invention is an electrolytic solution for electrolytic capacitor wherein at least one of azelaic acid, sebacic acid, 1-methyl-azelaic acid, 1,6-decanedicarboxylic acid, and a salt thereof is dissolved as the solute in ethylene glycol and 15-50 wt % of the total electrolytic solution of water, a straight-chain saturated dicarboxylic acid represented by the general formula: $HOOC(CH_2)_nCOOH$ (wherein n indicates an integer from 9 to 11) is added, and a hydrophobic film is formed on the electrode foil.

Further, the present invention reveals as another aspect that by adding fatty acid alkanolamide to the electrolytic solution, a hydrophobic film is formed in which the nitrogen or the oxygen of the hydroxyl group (—OH group) of the alcohol moiety comprised in this fatty acid alkanolamide is thought to coordinate bond with aluminum at the electrode foil surface, and addition of a large amount of water to the electrolytic solution is allowed since this hydrophobic film suppresses the hydration reaction between the electrode foil and water. The present invention also reveals that by adding this fatty acid alkanolamide, it is possible to retain good lifespan property of the electrolytic capacitor in a medium/high-voltage electrolytic solution by having low specific resistance property and by suppressing the hydration decomposition of the electrode foil, wherein the electrolytic solution is azelaic acid, sebacic acid, 1-methyl-azelaic acid, 1,6-decanedicarboxylic acid, or a salt thereof dissolved in a solvent having a large amount of water added to ethylene glycol.

In other words, the electrolytic solution for electrolytic capacitor according to another embodiment of the present invention is an electrolytic solution for electrolytic capacitor wherein at least one of azelaic acid, sebacic acid, 1-methyl-azelaic acid, 1,6-decanedicarboxylic acid, and a salt thereof is dissolved as the solute in ethylene glycol and 15-50 wt % of the total electrolytic solution of water, fatty acid alkanolamide is added, and a hydrophobic film is formed on the electrode foil.

According to the present invention, by employing an electrolytic solution capable of both reliability and reduced impedance wherein a hydrophobic film is formed by adding a straight-chain saturated dicarboxylic acid or fatty acid alkanolamide having n=9 to 11 as stated above to the electrolytic solution for medium/high-voltage electrolytic capacitor wherein the hydrophobic film is made by coordinate bonding of these with the electrode foil surface, and wherein addition of a large amount of water to the electrolytic solution is allowed since this hydrophobic film suppresses the hydration reaction between the electrode foil and water, a medium/high-voltage electrolytic capacitor which is high-frequency low-impedance and further having good reliability can be provided.

DESCRIPTION OF EMBODIMENTS

First Embodiment

The electrolytic solution for electrolytic capacitor of the first embodiment of the present invention employs an electrolytic solution for electrolytic capacitor wherein at least one of azelaic acid, sebacic acid, 1-methyl-azelaic acid, 1,6-decanedicarboxylic acid, and a salt thereof is dissolved as the solute in ethylene glycol and 15-50 wt % of the total electrolytic solution of water, and a straight-chain saturated dicarboxylic acid represented by the general formula: $HOOC(CH_2)_n COOH$ (wherein n indicates an integer from 9 to 11) is added.

electrolytic capacitor is obtained even when this straight-chain saturated dicarboxylic acid is added to around the dissolution limit.

The water content is 15-50 wt %, preferably 15-35 wt %. Sufficient specific resistance reducing effect cannot be obtained at below this range, and hydration decomposition of the electrode foil cannot be suppressed at above this range.

Examples of a salt of azelaic acid, sebacic acid, 1-methyl-azelaic acid, and 1,6-decanedicarboxylic acid employed for the electrolytic solution of the present invention can include an ammonium salt, as well as a primary amine salt such as methylamine, ethylamine, t-butylamine, and n-propylamine, a secondary amine salt such as dimethylamine, ethylmethylamine, diethylamine, di-n-propylamine, and diisopropylamine, a tertiary amine salt such as tri-n-propylamine, trimethylamine, triethylamine, tri-n-butylamine, and dimethylethylamine, and a salt of diethanolamine, triethanolamine, naphthalenediamine, and benzylamine etc. Good hydration suppression effect is seen particularly when a secondary amine salt is employed.

In addition, sparking voltage will be raised when one or two or more selected from polyvalent alcohols consisting of polyoxyethylene glycerin, polyglycerin, and glycerin is added.

Moreover, since the internal pressure increase of an electrolytic capacitor that employs this electrolytic solution can be decreased by adding one or two or more selected from nitro compounds consisting of nitrobenzoic acid, nitrophenol, and nitroanisole, the high-temperature lifespan property of the electrolytic capacitor will be improved.

Examples

The first embodiment of the present invention will now be further specifically described by Examples. The composition of the electrolytic solution for electrolytic capacitor and the specific resistance of Examples and Comparative Examples of the first embodiment of the present invention are shown in Table 1.

TABLE 1

| | Electrolytic solution composition (wt %) | | | | | | Specific resistance ($\Omega \cdot cm$) |
|---|---|---|---|---|---|---|---|
| | Ethylene glycol | Water | Azelaic acid | Undecanoic diacid | Dodecanoic diacid | Tridecanoic diacid | |
| Comparative Example 1 | 88 | 5 | 6 | | | 1 | 671 |
| Example 1 | 78 | 15 | 6 | | | 1 | 480 |
| Example 2 | 68 | 25 | 6 | | | 1 | 329 |
| Example 3 | 69 | 25 | 6 | 1 | | | 268 |
| Example 4 | 69 | 25 | 6 | | 1 | | 322 |
| Comparative Example 2 | 69 | 25 | 6 | | | | 359 |
| Example 5 | 58 | 35 | 6 | | | 1 | 227 |
| Example 6 | 43 | 50 | 6 | | | 1 | 130 |
| Comparative Example 3 | 33 | 60 | 6 | | | 1 | 79 |

Good hydration decomposition suppression effect of the electrode foil is shown with the amount of a straight-chain saturated dicarboxylic acid represented by the general formula: $HOOC(CH_2)_n COOH$ (wherein n indicates an integer from 9 to 11) added at 0.1 wt % or more, preferably 0.5 wt % or more of the total electrolytic solution, and hydration decomposition suppression effect will be low at below this range. In addition, a low-resistance electrolytic solution for Next, a capacitor element having the anode and cathode foils wound via an electrolytic paper was impregnated with electrolytic solutions shown in Table 1 to generate electrolytic capacitors having 450 V-6.8 pF ($\phi 10\times 20$ mmL). Since the electrolytic capacitor that employed the electrolytic solution of Comparative Example 3 had low withstand voltage, this was produced by using 300 V as the applied voltage in the aging step of producing an electrolytic capacitor. After measuring the initial electric capacitance property of these electrolytic capacitors, the rate of change in electric capacitance property after high-temperature no-load test (left at 105° C. for 1000 hours) was determined. The above test results are shown in Table 2.

TABLE 2

|  | Rate of change in thermoelectric capacitance (%): 105° C. no-load shelf test Rate of change after 1000 hours |
|---|---|
| Comparative Example 1 | 1.2 |
| Example 1 | 3.2 |
| Example 2 | 6 |
| Example 3 | 8.6 |
| Example 4 | 8 |
| Comparative Example 2 | 9.4 |
| Example 5 | 10 |
| Example 6 | 19.6 |
| Comparative Example 3 | 36 |

As seen from Table 1, when the amount of water in the electrolytic solution added was less than 15 wt % as in Comparative Example 1, the specific resistance of the electrolytic solution was high and thus unsuitable for high-frequency low-impedance electrolytic capacitor application. In contrast, the specific resistance of the electrolytic solution was sufficiently suppressed in each of the Examples, and an electrolytic solution suitable for high-frequency low-impedance electrolytic capacitor application is obtained.

Moreover, as seen from Table 2, by comparing Examples 2 to 4 and Comparative Example 2 in which the amount of water added was 25 wt %, the rate of change in electric capacitance after 105° C. high-temperature no-load shelf test was suppressed low in Examples 2 to 4 in which a straight-chain saturated dicarboxylic acid represented by the general formula: $HOOC(CH_2)_nCOOH$ (wherein n indicates an integer from 9 to 11) was added compared to Comparative Example 2 without addition. This confirmed that oxide film decomposition of the anodic electrode foil was suppressed and the reliability of the electrolytic capacitor was improved by adding this straight-chain saturated dicarboxylic acid represented by the general formula: $HOOC(CH_2)_nCOOH$ (wherein n indicates an integer from 9 to 11). In particular, significant oxide film decomposition suppression effect was seen in Example 2 with addition of tridecanoic diacid.

In addition, in Examples 1 to 6 in which the amount of water content added was 15-50 wt %, the rate of change in electric capacitance was suppressed to 20% or less even when 1000 hours of 105° C. high-temperature no-load shelf test was performed and an electrolytic capacitor with good reliability is obtained. In contrast, in Comparative Example 3 in which the amount of water content added was greater than 50 wt %, the rate of change in electric capacitance after 1000 hours of 105° C. high-temperature no-load shelf test was significantly increased to 36%, and hydration decomposition of the electrode foil cannot be suppressed even when a straight-chain saturated dicarboxylic acid represented by the general formula: $HOOC(CH_2)_nCOOH$ (wherein n indicates an integer from 9 to 11) is added.

Further, when the 105° C. high-temperature no-load test was continued to 2000 hours, stable property for the rate of change in electric capacitance was obtained in Examples to 5 in which the amount of water content in the electrolytic solution added was 15-35 wt %.

Second Embodiment

The electrolytic solution for electrolytic capacitor of the second embodiment of the present invention is prepared similarly to the first embodiment except that a fatty acid alkanolamide is added instead of the straight-chain saturated dicarboxylic acid used in the first embodiment.

Examples of a fatty acid alkanolamide added to the electrolytic solution can include coconut fatty acid diethanolamide, lauric acid diethanolamide, oleic acid diethanolamide, coconut fatty acid monoethanolamide, and lauric acid isopropanolamide.

The amount of fatty acid alkanolamide added is 1-10 wt %, preferably 3-7 wt %, and particularly preferably 5 wt % of the total electrolytic solution. Hydration decomposition suppression effect will be low at below this range, and sufficient specific resistance reducing effect cannot be obtained at above this range.

Moreover, a straight-chain saturated dicarboxylic acid represented by the general formula: $HOOC(CH_2)_nCOOH$ (wherein n indicates an integer from 9 to 11) used in the first embodiment can be used in combination and added to the electrolytic solution. As a result, further specific resistance reducing effect and hydration suppression effect can be obtained.

Examples

The second embodiment of the present invention will now be further specifically described by Examples.

First, as shown in Tables 3 to 5 below, the electrolytic solutions for electrolytic capacitors that are Examples and Comparative Examples of the second embodiment were prepared, and the specific resistance for each were measured. High-temperature no-load test (left at 105° C. for 1000 hours) was further performed in a similar manner to the first embodiment, and the rate of change in electric capacitance property after testing was determined.

First, the result of verifying the change in moisture content of electrolytic solution is shown in Table 3.

TABLE 3

| | Electrolytic solution composition (wt %) | | | | | | ΔCap after |
|---|---|---|---|---|---|---|---|
| | Ethylene glycol | Moisture content | Azelaic acid | Lauric acid diethanolamide | Tridecanoic diacid | Specific resistance (Ω · cm) | 1000 h at 105° C. |
| Comparative Example 4 | 83 | 5 | 6 | 5 | 1 | 1015 | 0.8 |
| Example 7 | 73 | 15 | 6 | 5 | 1 | 675 | 2.2 |
| Example 8 | 63 | 25 | 6 | 5 | 1 | 382 | 4.1 |
| Example 9 | 53 | 35 | 6 | 5 | 1 | 269 | 6.8 |

TABLE 3-continued

| | Electrolytic solution composition (wt %) | | | | | Specific resistance (Ω·cm) | ΔCap after 1000 h at 105° C. |
|---|---|---|---|---|---|---|---|
| | Ethylene glycol | Moisture content | Azelaic acid | Lauric acid diethanolamide | Tridecanoic diacid | | |
| Example 10 | 38 | 50 | 6 | 5 | 1 | 157.5 | 13.3 |
| Comparative Example 5 | 28 | 60 | 6 | 5 | 1 | — | — |

As seen from Table 3, when the amount of water in the electrolytic solution added was less than 15 wt % as in Comparative Example 4, although the rate of change in electric capacitance after 105° C. high-temperature no-load shelf test was low, the specific resistance of the electrolytic solution was high and thus unsuitable for high-frequency low-impedance electrolytic capacitor application. In addition, when the amount of water in the electrolytic solution added was greater than 50 wt % as in Comparative Example 5, hydration decomposition of the electrode foil was significant, and Comparative Example 5 having a moisture content of 60 wt % had immeasurable specific resistance and rate of change in electric capacitance property. On the other hand, in each of the Examples, the specific resistance of the electrolytic solution was sufficiently suppressed and the rate of change in electric capacitance could also be suppressed low, and an electrolytic solution suitable for high-frequency low-impedance electrolytic capacitor application is obtained.

Next, the result of verifying the change in the amount of fatty acid alkanolamide added is shown in Table 4.

TABLE 4

| | Electrolytic solution composition (wt %) | | | | | Specific resistance (Ω·cm) | ΔCap after 1000 h at 105° C. |
|---|---|---|---|---|---|---|---|
| | Ethylene glycol | Moisture content | Azelaic acid | Lauric acid diethanolamide | Tridecanoic diacid | | |
| Example 2 | 68 | 25 | 6 | 0 | 1 | 329 | 6.0 |
| Example 11 | 67 | 25 | 6 | 1 | 1 | 340 | 5.4 |
| Example 12 | 65 | 25 | 6 | 3 | 1 | 357 | 5.0 |
| Example 8 | 63 | 25 | 6 | 5 | 1 | 382 | 4.1 |
| Example 13 | 61 | 25 | 6 | 7 | 1 | 447 | 1.4 |
| Example 14 | 58 | 25 | 6 | 10 | 1 | 463 | 1.2 |

As seen from Table 4, compared to Example 2 of the first embodiment without addition of fatty acid alkanolamide, Examples 8 and 11 to 14 were slightly increased in the specific resistance, but the rate of change in electric capacitance was suppressed lower. In particular, it is seen that the specific resistance and the rate of change in electric capacitance were both retained in a good range in Examples 8, 12 and 13 in which the amount of fatty acid alkanolamide added was in the range of 3-7 wt %, in particular in Example 8 in which 5 wt % was added.

All of the Examples stated above uses a fatty acid alkanolamide and a straight-chain saturated dicarboxylic acid in combination, but a similar effect can also be obtained as shown in Table 5 when a fatty acid alkanolamide is added alone.

TABLE 5

| | Electrolytic solution composition (wt %) | | | | | | Specific resistance (Ω·cm) | ΔCap after 1000 h at 105° C. |
|---|---|---|---|---|---|---|---|---|
| | Ethylene glycol | Moisture content | Azelaic acid | Lauric acid diethanolamide | Oleic acid diethanolamide | Tridecanoic diacid | | |
| Comparative Example 2 | 69 | 25 | 6 | 0 | 0 | 0 | 359 | 9.4 |
| Example 15 | 68 | 25 | 6 | 1 | 0 | 0 | 345 | 5.7 |

TABLE 5-continued

| | Electrolytic solution composition (wt %) | | | | | | Specific resistance (Ω·cm) | ΔCap after 1000 h at 105° C. |
|---|---|---|---|---|---|---|---|---|
| | Ethylene glycol | Moisture content | Azelaic acid | Lauric acid diethanolamide | Oleic acid diethanolamide | Tridecanoic diacid | | |
| Example 16 | 68 | 25 | 6 | 0 | 1 | 0 | 343 | 4.9 |
| Example 11 | 67 | 25 | 6 | 1 | 0 | 1 | 340 | 5.4 |

As shown in Table 5, the specific resistance and the rate of change of electric capacitance were suppressed low in Examples 15 and 16 in which only a fatty acid alkanolamide was added compared to Comparative Example 2. Even when compared to Example 11 in which a fatty acid alkanolamide and a straight-chain saturated dicarboxylic acid were used in combination, it is seen that the specific resistance and the rate of change of electric capacitance of Examples 15 and 16 are retained in a good range.

Although azelaic acid is employed as the solute in each of the Examples of the first and second embodiments, similar effect is confirmed when sebacic acid, 1-methyl-azelaic acid, 1,6-decanedicarboxylic acid, and a salt thereof are employed.

The electrolytic solution for medium/high-voltage electrolytic capacitor of the present invention allows production of a medium/high-voltage electrolytic capacitor which is high-frequency low-impedance and further having good reliability, since hydration decomposition of the electrode foil is suppressed even when a large amount of water is added.

The invention claimed is:

1. An electrolytic solution for electrolytic capacitor, wherein at least one of azelaic acid, sebacic acid, 1-methyl-azelaic acid, 1,6-decanedicarboxylic acid, and a salt thereof is dissolved as a solute in ethylene glycol and 15-50 wt % of the total electrolytic solution of water, a straight-chain saturated dicarboxylic acid represented by general formula (1) is added for forming a hydrophobic film on an electrode foil:

$$HOOC(CH_2)_nCOOH \quad (1)$$

wherein n indicates an integer from 9 to 11.

2. An electrolytic solution for electrolytic capacitor, wherein at least one of azelaic acid, sebacic acid, 1-methyl-azelaic acid, 1,6-decanedicarboxylic acid, and a salt thereof is dissolved as a solute in ethylene glycol and 15-50 wt % of the total electrolytic solution of water, fatty acid alkanolamide is added for forming a hydrophobic film on an electrode foil.

3. An electrolytic solution for electrolytic capacitor, wherein at least one of azelaic acid, sebacic acid, 1-methyl-azelaic acid, 1,6-decanedicarboxylic acid, and a salt thereof is dissolved as a solute in ethylene glycol and 15-50 wt % of the total electrolytic solution of water, a straight-chain saturated dicarboxylic acid and a fatty acid alkanolamide represented by general formula (1) are added for forming a hydrophobic film on an electrode foil:

$$HOOC(CH_2)_nCOOH \quad (1)$$

wherein n indicates an integer from 9 to 11.

4. The electrolytic solution for electrolytic capacitor according to claim 2, wherein lauric acid diethanolamide is used as the fatty acid alkanolamide.

5. An electrolytic capacitor using the electrolytic solution for electrolytic capacitor according to claim 1.

6. An electrolytic capacitor comprising:
an electrolytic solution in which at least one of azelaic acid, sebacic acid, 1-methyl-azelaic acid, 1,6-decanedicarboxylic acid, and a salt thereof is dissolved as a solute in ethylene glycol and 15-50 wt % of the total electrolytic solution of water; and
an electrode foil including a hydrophobic film comprising a fatty acid alkanolamide formed thereon.

7. The electrolytic solution for electrolytic capacitor according to claim 3, wherein lauric acid diethanolamide is used as the fatty acid alkanolamide.

8. An electrolytic capacitor using the electrolytic solution for electrolytic capacitor according to claim 2.

9. An electrolytic capacitor using the electrolytic solution for electrolytic capacitor according to any one of claim 3.

10. An electrolytic capacitor using the electrolytic solution for electrolytic capacitor according to any one of claim 4.

11. An electrolytic capacitor using the electrolytic solution for electrolytic capacitor according to any one of claim 7.

12. The electrolytic solution for electrolytic capacitor according to claim 1, wherein the straight-chain saturated dicarboxylic acid is added at 0.1 wt % or more of the total electrolytic solution.

13. The electrolytic solution for electrolytic capacitor according to claim 1, wherein the straight-chain saturated dicarboxylic acid is added at 0.5 wt % or more of the total electrolytic solution.

14. The electrolytic solution for electrolytic capacitor according to claim 2, wherein the fatty acid alkanolamide is added at 1-10 wt % of the total electrolytic solution.

15. The electrolytic solution for electrolytic capacitor according to claim 2, wherein the fatty acid alkanolamide is added at 3-7 wt % of the total electrolytic solution.

16. The electrolytic solution for electrolytic capacitor according to claim 2, wherein the fatty acid alkanolamide is added at 5 wt % of the total electrolytic solution.

17. The electrolytic solution for electrolytic capacitor according to claim 3, wherein the straight-chain saturated dicarboxylic acid is added at 0.1 wt % or more of the total electrolytic solution.

18. The electrolytic solution for electrolytic capacitor according to claim 3, wherein the fatty acid alkanolamide is added at 1-10 wt % of the total electrolytic solution.

19. The electrolytic solution for electrolytic capacitor according to claim 17, wherein the fatty acid alkanolamide is added at 1-10 wt % of the total electrolytic solution.

* * * * *